June 18, 1968 W. H. McLELLAN 3,389,362
LOW PRESSURE TRANSDUCER
Filed Oct. 22, 1965 2 Sheets-Sheet 1
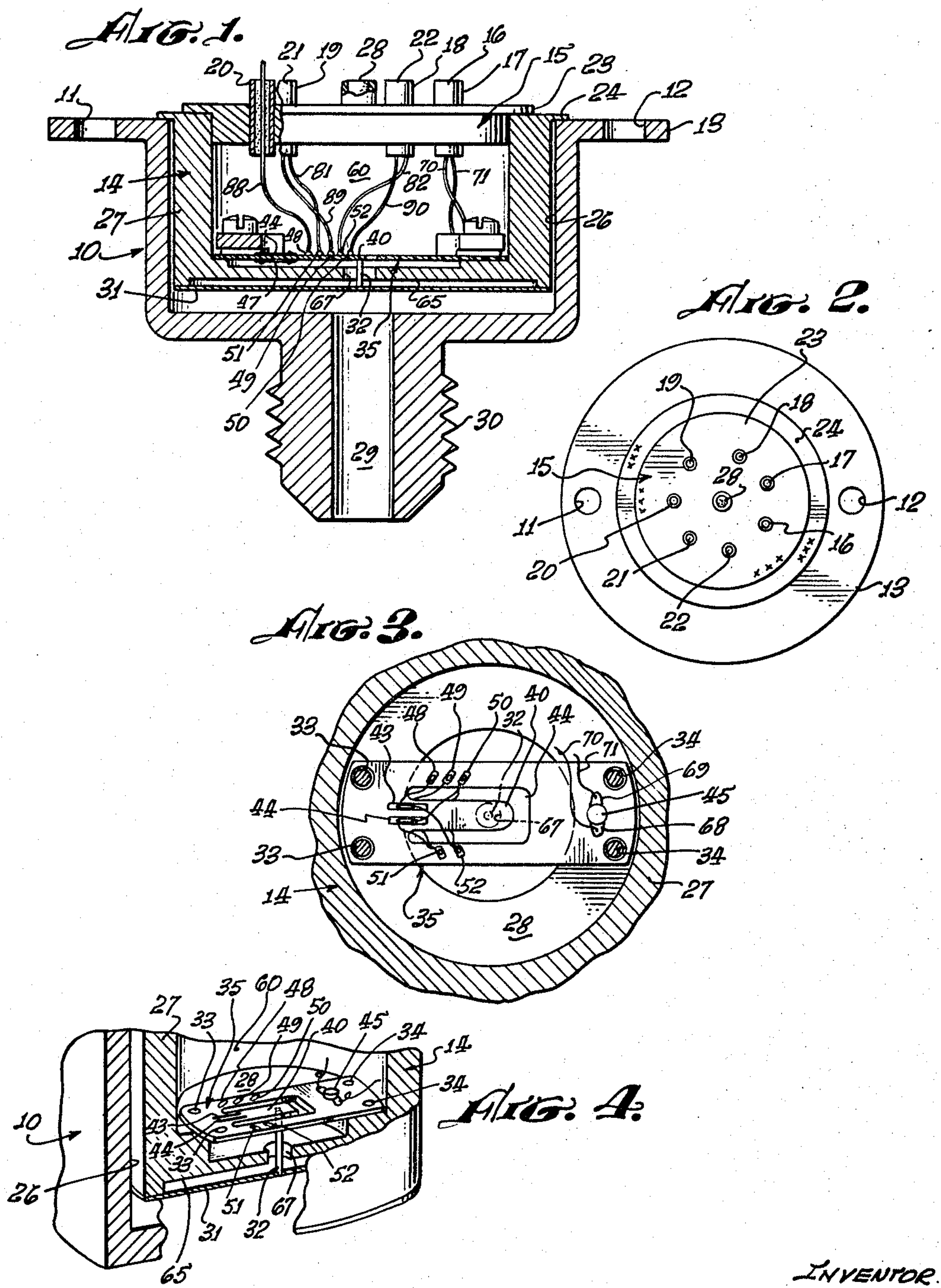
INVENTOR.
WILLIAM H. McLELLAN,
By His Attorneys
Spensley & Horn.

June 18, 1968 W. H. McLELLAN 3,389,362
LOW PRESSURE TRANSDUCER
Filed Oct. 22, 1965 2 Sheets-Sheet 2
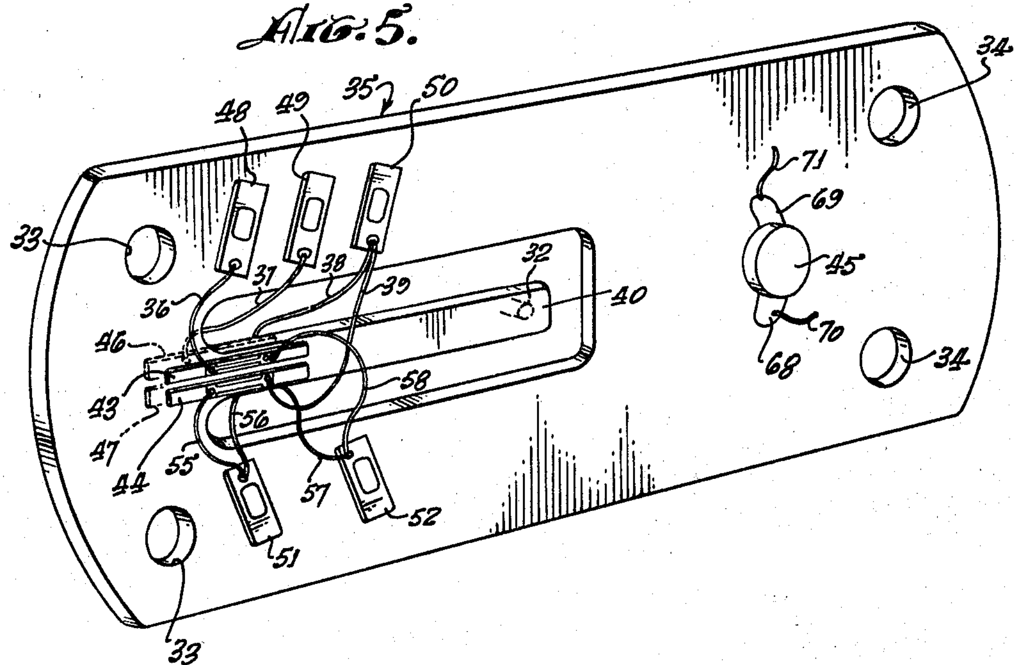
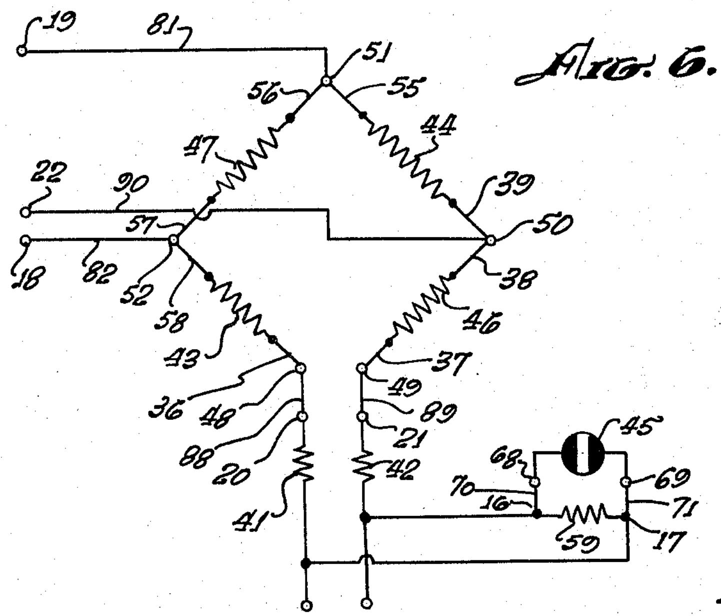
INVENTOR.
WILLIAM H. McLELLAN,
By His Attorneys
Spensley & Horn.

United States Patent Office 3,389,362
Patented June 18, 1968

3,389,362
LOW PRESSURE TRANSDUCER

William H. McLellan, Pasadena, Calif., assignor to Electro-Optical Systems, Inc., Pasadena, Calif., a corporation of California Filed Oct. 22, 1965, Ser. No. 501,612
8 Claims. (Cl. 338—4)

ABSTRACT OF THE DISCLOSURE

Pressure transducer structure having a casing sealed by a diaphragm coupled by a force pin to the cantilever beam of a beam pressure sensing module disposed within the casing, the module including a slotted plate defining an integral cantilever beam portion projecting from a beam-supporting portion, a sensor element bonded to the cantilever beam portion, an electrical contact tab bonded to the beam-supporting portion and a pigtail lead interconnecting the sensor element with the contact tab. Limit stop means are provided within the casing for limiting diaphragm movement.

*Background of the invention*

With the advent of vehicles capable of leaving the earth's atmosphere and traveling in the extremely low pressure environment of space, there arose a need for stable transducing elements for the direct sensing of such extremely low pressures. This need is particularly great in altitude indicators for spacecraft, wherein great distances must be accurately measured, and this need has not been adequately fulfilled by present art devices. Most present art devices utilize beam members which are relatively stiff and hence incapable of indicating extremely low pressures. Other present art devices utilize diaphragms which present gaging difficulties when made thin enough to be responsive to such low pressures. Another problem experienced in prior art devices has been case sensitivity, which is characterized by a change in output due to external pressures on the case enclosing the sensor.

Furthermore, when testing prior art diaphragm type devices for leaks, the diaphragm is often subjected to pressures which are greater than the intended operating maximum. Prior art devices of the diaphragm type typically employ a long stop pin to limit diaphragm travel, and stressing of the diaphragm during testing resulted in the danger of running the stop pin through the diaphragm. Also, the prior art devices are characterized by excessive zero shift with time, primarily due to slow out-gassing of the sensor materials and minute leaks in the device casings.

*Summary of the invention*

The present invention contemplates a novel, improved low pressure transducer which overcomes the difficulties encountered in the prior art devices and which is more stable, more accurate, and relatively insensitive to external and environmental factors which often caused failure in prior art low pressure transducers. The pressure levels at which the present invention device is best applicable is in the range of zero to one, or zero to three pounds per square inch. However, by appropriate modification of diaphragm thickness, the present invention device may be usable through ranges up to 100 p.s.i.

The low pressure transducer of the present invention is of the beam-diaphragm type having a beam integral with the frame and a diaphragm coupled to the beam by a short force pin. The beam forms an elongate cantilever element in the beam frame which responds to pressure from the diaphragm, diaphragm movement being in response to pressure from the external environment. The beam frame is supported within a sealed housing which has strong walls enclosed at one end by the diaphragm. The beam is supported at its opposite end by an electrical connection terminal header. The space within the sealed housing is a reference volume which is relatively large compared to those of prior art devices and to the diaphragm surface. As a result, there will be a relatively minute zero shift in time due to out-gassing of the metals of the housing and the components thereof. In accordance with another feature of the present invention, there is provided an undercut in the bottom surface of the reference volume cavity between the bottom surface and the diaphragm, to thereby provide a limit stop of larger area than exists in the prior art devices of this nature. This larger surface area prevents overstressing of the diaphragm during leak tests and the like, and in this respect provides an advantage over prior art limit elements.

The above described sealed reference volume housing and diaphragm is inserted in an exterior housing with a gap between the outer surface of the reference volume cavity and the inner surface of the exterior housing. Thus, the mechanical pressure on the outer case is isolated from the sensor case. Such pressures may occur during installation of the transducer when wrenches or other tools are used during the installation process.

A feature of the beam-diaphragm structure employed in this invention is the existence of a very narrow gap on either side of the cantilever beam between the beam and the beam frame. Strain sensors are mounted at the base of the cantilever beam, and because of the short gap between the cantilever element and the supporting frame it is possible to make the interconnecting electrical leads from the sensing elements to electrical contacts extremely short. In a presently preferred embodiment of the present invention device, these leads are no more than 1/32" in length. The location of the electrical contacts on the beam frame is such that the connection of wires from the contacts to terminal pins in a terminal header is relatively easily made in such a manner that these wires will not be subjected to strains during operation of the transducer.

Accordingly, it is an object of the present invention to provide an improved low pressure sensing transducer.

It is also an object of the present invention to provide an improved low pressure transducer characterized by very low case sensitivity.

It is a further object of the present invention to provide an improved low pressure transducer characterized by extremely low zero shift with time.

It is another object of the present invention to provide an improved low pressure transducer of the diaphragm type having an over-travel stop of relatively large area to prevent overstressing of the diaphragm.

It is a still further object of the present invention to provide an improved low pressure transducer of the beam-diaphragm type.

It is yet another object of the present invention to provide an improved low pressure transducer in which the transducer element is isolated from the exterior casing.

It is also an object of the present invention to provide an improved low pressure transducer incorporating a relatively large reference volume in a sealed cavity.

It is a still further object of the present invention to provide a low pressure sensing transducer characterized by good zero stability and sensitivity.

It is a still further object of the present invention to provide a low pressure transducer of the beam-diaphragm type having optimum operating characteristics, optimum stability and optimum sensitivity.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

*Brief description of the drawing*

FIGURE 1 is a cross-sectional view of a presently preferred transducer embodiment;

FIGURE 2 is a plan view of the transducer embodiment of FIGURE 1;

FIGURE 3 is a plan view of the beam element utilized in the FIGURE 1 embodiment, shown partially in section through the line 3—3 of FIGURE 1;

FIGURE 4 is a partially cut away perspective view showing the interior of the transducer of FIGURE 1;

FIGURE 5 is an enlarged plan view of the gaged beam structure utilized in FIGURE 1; and FIGURE 6 is a schematic diagram showing the electrical connections to the various gage elements.

*Description of the preferred embodiment*

The present invention will be described with reference to a presently preferred embodiment of a low pressure transducer for operation at pressures in the range of from 0–1 or 0–3 p.s.i., this type of instrument being particularly suitable for altitude sensing in space vehicles.

Turning now to the drawing, a representative transducer structure is shown in the various figures. With particular reference to FIGURE 1, the transducer can be seen to comprise an outer housing 10 of generally cylindrical configuration and defining a threaded nipple 30 at the bottom thereof. A bore 29 extends centrally through the nipple 30 and is in communication with an inner bore 26 in the housing 10. The top of the housing 10 defines a peripheral flange 13 having a series of spaced apart mounting holes therein, the illustrated embodiment having two diametrically opposed mounting holes 11 and 12.

Fitted within the central bore 26 of the outer housing 10 is the main body portion 27 of an inner housing 14. The inner housing 14 has an inner bore 60 which forms the transducer housing, as will be hereinbelow explained.

FIGURES 3, 4 and 5 of the drawing show various views of the beam pressure sensing element. A beam frame 35 has an interior portion cut away to define an elongate cantilever beam 40. The beam frame 35 is an elongate structure having curved ends to fit within the inner bore 60 of the inner housing 14. The beam frame 35 is provided with at one of its ends a pair of spaced apart mounting holes 33, the other end being provided with another pair of spaced apart mounting holes 34, as can best be seen in FIGURE 5.

In the illustrated embodiment the cantilever beam structure 40 is an integral part of the beam frame 35, the cantilever beam being defined by the generally U-shaped slot cut in the beam frame. Bonded to the upper surface of the beam frame 35, at that portion of the beam frame defining the base end of the cantilever beam 40, are a pair of elongate piezoresistive sensors 43 and 44. Another pair of piezoresistive sensors 46 and 47 are bonded to the underside of the beam frame and positioned directly beneath the respective sensors 43 and 44.

A series of three electrical contact tabs 48, 49 and 50 are mounted to the upper surface of the beam frame and electrically insulated therefrom. The contact tabs, 48, 49 and 50 are positioned to one side of the beam 40. A pair of electrical contact tabs 51 and 52 are positioned on the other side of the beam 40, these tabs being mounted to the upper surface of the beam frame and electrically insulated therefrom. A series of pigtail leads connect the various contact tabs with the piezoresistive sensors 43, 44, 46 and 47. A pigtail lead 36 connects one end of the sensor 43 to the contact tab 48, a pigtail lead 37 connecting one end of the sensor 46 to the contact tab 49.

Two pigtail leads, 38 and 39, are connected to the contact tab 50, the lead 38 being connected to the other end of the sensor 46, the lead 39 being connected to one end of the sensor 44. One end of two pigtail leads, 55 and 56, are connected to the contact tab 51, the other end of the lead 55 being connected to the other end of the sensor 44, with the other end of the lead 56 being connected to one end of sensor 47. One end of each of a pair of pigtail leads 57 and 58 are connected to the contact tab 52, the other end of the lead 57 being connected to the other end of the sensor 47, while the other end of the lead 58 is connected to the other end of the sensor 43. Thus, the piezoresistive sensors are electrically connected in a bridge circuit, as shown in the schematic diagram of FIGURE 6, wherein the sensors 43, 44, 46 and 47 are schematically represented by resistance symbols. Mounted to the upper open end of the inner housing 14 is a header 15 having a peripheral flange 23 which rests on a flange 24 of inner housing 14, as can best be seen in FIGURE 1. A series of seven terminal pins 16–22 are sealed in the header 15 and project both above and below the header. The upper portions of the terminal pins project above the header 15 to facilitate electrical connections to external circuits, while the lower ends of the terminal pins projecting into the inner bore 60 facilitate electrical connection to the interior of the transducer housing. In assembling the device, the flange 23 is seam welded to the flange 24 defined by the upper surface of the inner housing 14, the flange 24 being seam welded to the peripheral flange 13 of the outer housing 10.

A temperature sensor 45 is mounted to the upper surface of the beam frame 35 at a point opposite the free end of the beam 40. The temperature sensing element 45 is provided with connecting tabs 68 and 69 and connection leads 70 and 71 leading therefrom.

An external shunt 59 (indicated schematically in FIGURE 6) can be connected across the temperature sensor 45 to regulate the effect of the temperature sensor to maintain bridge balance over a desired temperature range, such as from −65° F. to +250° F. External balance resistors 41 and 42 (indicated schematically in FIGURE 6) can be utilized for compensation purposes to provide slope correction in a vernier fashion to provide greater accuracy. This correction circuitry is external to the transducer and hence indicated only schematically.

The electrical leads 70 and 71 extending from the connecting tabs 68 and 69 of the temperature sensor 45 are connected to the respective terminal pins 16 and 17, as indicated in FIGURE 1 of the drawing. The contact tab 51 is connected to the terminal pin 21 by a pigtail lead 81, a pigtail lead 82 connecting the contact tab 52 to the terminal pin 22. A pigtail lead 88 is connected between the contact tab 48 and the terminal pin 20. A pigtail lead 89 connects the contact tab 49 with the terminal pin 19, and a pigtail lead 90 connects the contact tab 50 with the terminal pin 18.

As can best be seen in FIGURE 4, the lower surface of the inner housing 14 defines a central recessed portion 65 and a coaxial passageway 67 extending through to the inner bore 60. A thin diaphragm 31 is peripherally sealed to the lowermost surface of the inner housing 14, the center of the diaphragm being coupled by a force pin 32 to the free end of the beam 40, the force pin 32 extending through the passageway 67 and being spot welded to the diaphragm and to the beam. The diaphragm 31 is sealed in fluid-tight engagement across the recessed portion 65 of the inner housing 14, the lower surface of the diaphragm being exposed to the operative fluid. Bowing of the diaphragm 31 in accordance with the difference between the fluid pressure of the operative fluid and the pressure within the reference volume defined by the inner bore 60 causes movement of the force pin 32, thereby deflecting the beam 40 and causing a change in the electrical output of the transducer. As previously mentioned, the illustrated embodiment is intended for very low pressure sensing in the range of 1–2 p.s.i. However, pressures on the order of 50–100 p.s.i. may be sensed upon appropriate modification of the diaphragm thickness, as will be apparent to those skilled in the art.

In the illustrated embodiment, the reference volume bounded by the inner bore 60 of the inner housing 14 is totally enclosed by the diaphragm 31 on the bottom and by the header 15 on the top. This reference volume is intentionally made relatively large, and, for space vehicle applications, is maintained at zero pressure. A central hole 28 is provided in the header 15 to facilitate the creation of the desired pressure within the reference volume. In the illustrated embodiment wherein the reference volume is maintained at zero pressure, a vacuum hose is placed in communication with the hole 28, utilizing suitable coupling fittings not shown. Upon achieving the desired vacuum, the hole 28 is sealed. The hole 28 also facilitates leak testing of the device during assembly.

It is apparent that some means must be provided for limiting diaphragm travel in an instrument of the illustrated type intended for operation in the 0–1 p.s.i.a. range, since prior to use in the low pressure environment the diaphragm will be subject to the earth's atmospheric pressure. It has been the prior art practice to utilize an elongate stop pin typically mounted to the header and projecting through the reference volume to terminate adjacent the diaphragm and spaced slightly therefrom. However, the stop pin technique for preventing diaphragm over-travel requires accurate positioning of the header a predetermined distance from the diaphragm. Also, it is usually desirable to subject the instruments to leak testing at a point in the assembly process before such a stop pin is usually installed. The illustrated transducer embodiment overcomes these disadvantages through the use of a recessed portion 65 in the lower surface of the inner housing 14 adjacent the diaphragm. The depth of the recessed portion 65 is made equal to the maximum desired diaphragm travel, thereby providing a large area limit-stop surface which will limit the travel of the diaphragm 31 and thereby prevent over-stressing of the diaphragm until the instrument is placed in the low pressure operating environment.

Bowing of the diaphragm 31 in response to the pressure of the operating fluid will cause deflection of the beam 40, thereby resulting in changes in the resistance of the piezoresistive sensors 43, 44, 46 and 47. Changes in the resistance of these sensors will alter the balance of the electrical bridge circuit, which electrical changes are measured in external circuitry, as is well known in the art.

Thus, there has been described a novel pressure-responsive transducer for operation at extremely low pressures. Case sensitivity is minimized through the use of an internal housing which is nested within an external housing, and separated therefrom by an air gap. The sealed reference volume is quite large so that out-gassing and minute leaks will not cause excessive zero shift with time. An overtravel stop is provided in the form of a machined step in the lower surface of the inner housing to provide an immovable, large stopping area, thereby eliminating the necessity of a stop pin and the necessity of accurate spacing of the header from the diaphragm. Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A pressure transducer comprising:
(a) a generally tubular hermetically sealed casing defining a reference volume maintained at substantially zero pressure;
(b) a terminal header hermetically sealed to said casing and defining one end of said reference volume, said terminal header having sealed therein electrical terminals extending therethrough for connection to external electrical circuits;
(c) a flexible diaphragm hermetically sealed to said casing and defining the other end of said reference volume;
(d) limit stop means within said reference volume and disposed adjacent said diaphragm for limiting movement of said diaphragm into said reference volume;
(e) a beam support frame fixedly mounted within the reference volume of said casing, said beam support frame having a U-shaped slot therethrough to define an elongate cantilever beam element integral with said beam frame and deflectable with respect thereto;
(f) a force pin coupled between said cantilever beam and said diaphragm to cause deflection of said beam in response to movement of said diaphragm.
(g) a plurality of piezoresistive elements fixedly secured to said cantilever beam for deflection therewith so that movement of said diaphragm will result in changes in the electrical resistance of said piezoresistive elements;
(h) a plurality of electrical contact tabs mounted to said beam frame adjacent said cantilever beam portion and separated therefrom by said U-shaped slot;
(i) a plurailty of interconnecting leads electrically connecting said piezoresistive elements with said contact tabs; and,
(j) a plurality of lead wires electrically connecting said contact tabs with said electrical terminals within said reference volume.

2. A pressure transducer comprising:
(a) a generally tubular, hermetically sealing casing defining a reference volume;
(b) a terminal header hermetically sealed to said casing and defining one end of said reference volume, said terminal header having sealed therein electrical terminals extending therethrough for connection to external electrical circuits;
(c) a flexible diaphragm hermetically sealed to said casing and defining the other end of said reference volume;
(d) limit stop means within said reference volume and disposed adjacent said diaphragm for limiting movement of said diaphragm into said reference volume;
(e) a beam pressure sensing module disposed within the reference volume of said casing, said module including a slotted plate defining an integral cantilever beam first portion projecting from an at least partially surrounding beam-supporting second portion and deflectable with respect thereto, a sensor element bonded to the cantilever beam first portion of said slotted plate, an electrical contact tab bonded to the beam-supporting second portion of said slotted plate and electrically insulated therefrom, and a pigtail lead interconnecting said sensor element with said electrical contact tab, the beam-supporting second portion of said slotted plate being rigidly secured to said casing;
(f) a force pin disposed within said reference volume and having one end secured to the central portion of said diaphragm and the other end secured to the free end of said cantilever beam portion; and,
(g) means for electrically connecting said electrical contact tab to said electrical terminal connections within said reference volume.

3. A pressure transducer as defined in claim 1, wherein said limit stop means extends transversely across said reference volume and defines a central aperture therein.

4. The pressure transducer defined in claim 3 wherein said casing is inserted within an external housing, said casing contacting said external housing only at one end thereof whereby said casing is isolated from external pressures applied to said housing, said external housing having an opening therethrough adjacent the diaphragm in said casing.

5. A pressure transducer comprising:

(a) tubular casing means defining a reference volume;

(b) a terminal header hermetically sealed across one end of said casing and defining one end of said reference volume, said terminal header having sealed therein electrical terminals extending therethrough for connection to external electrical circuits;

(c) a flexible diaphragm hermetically sealed across the other end of said casing and defining the other end of said reference volume, whereby said reference volume is hermetically sealed;

(d) a cantilever beam mounted within said reference volume and fixedly secured at one end to said casing;

(e) a force pin coupled between said cantilever beam and said diaphragm to cause said deflection of said beam in response to movement of said diaphragm;

(f) a plurality of piezoresistive elements fixedly secured to said cantilever beam for deflection therewith whereby movement of said diaphragm will result in changes in the electrical resistance of said piezoresistive elements;

(g) a plurality of electrical leads electrically interconnecting said piezoresistive elements to said electrical terminals within said reference volume;

(h) limit stop means within said reference volume and disposed adjacent said diaphragm for limiting movement of said diaphragm into said reference volume; and, (i) an external housing, said tubular casing being disposed within said housing and contacting said housing only at the end of said casing sealed by said terminal header, whereby said casing is isolated from external pressures applied to said housing, said external housing defining an opening therethrough adjacent the diaphragm in said casing.

6. The pressure transducer defined in claim 5 wherein said plurality of piezoresistive elements is equal to 4, two of said piezoresistive elements being disposed on one side of the neutral axis of said beam and the other two of said piezoresistive elements being disposed on the other side of the neutral axis of said beam, said plurality of electrical leads being so arranged for the connection of said piezoresistive elements in an electrical bridge circuit.

7. The pressure transducer defined in claim 5 wherein said limit stop means is a surface provided within said reference volume between said beam and said diaphragm, said limit stop surface being positioned to limit the deflection of said diaphragm to a predetermined amplitude.

8. The pressure transducer defined in claim 5 wherein said tubular casing defines a peripherally extending mounting flange at the end of said casing sealed by said terminal header, said mounting flange being sealed to said exterior housing to provide mechanical isolation of said tubular casing from mechanical stresses applied to said exterior housing, said opening in said exterior housing defining means for coupling the interior of said housing to a source of operative fluid, the pressure of which is to be measured.

References Cited

UNITED STATES PATENTS

| | | | |
|---|---|---|---|
| 2,772,569 | 12/1956 | Ruge | 338—4 |
| 3,005,170 | 10/1961 | Starr | 338—2 |
| 3,022,672 | 2/1962 | Dimeff et al. | 73—398 |
| 3,161,061 | 12/1964 | Ames | 73—398 |
| 3,168,718 | 2/1965 | Swartz et al. | 338—42 |
| 3,168,826 | 2/1965 | Paetow | 338—4 |
| 3,269,184 | 8/1966 | O'Connor | 338—4 |

RICHARD M. WOOD, *Primary Examiner.*

W. D. BROOKS, *Assistant Examiner.*